R. Montgomery.
R. R. Cars.
No. 3,543. Reissued Jul. 6, 1869.

Witnesses.
G. B. Towles.
David A. Burr

Inventor.
R. Montgomery

THE ECKERT LITHOGRAPHING CO., WASHINGTON, D. C.

UNITED STATES PATENT OFFICE.

R. MONTGOMERY, OF NEW YORK, N. Y.

IMPROVEMENT IN FLOORS OF CARS AND BUILDINGS.

Specification forming part of Letters Patent No. 29,510, dated August 7, 1860; reissue No. 1,325, dated July 22, 1862; reissue No. 3,543, dated July 6, 1869.

DIVISION B.

*To all whom it may concern:*

Be it known that I, RICHARD MONTGOMERY, of the city, county, and State of New York, have invented a new and useful Improvement in Floors or Platforms for Iron Railway-Cars, and for other structures; and I do hereby declare the following to be a full and exact description thereof, reference being had to the accompanying drawings forming a part of this specification:

The nature of my invention consists of a fire-proof support for a floor, composed of arched metallic plates, corrugated in the direction of the curve of the arch, inserted between and resting upon metallic beams or girders, in such manner as to span and close the space between the same, said arches not only furnishing an intermediate central support between the beams for the flooring above if required, but also constituting a neat and ornamental ceiling for the room below.

Figure 1:
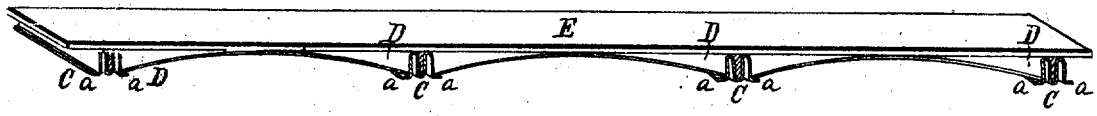
Figure 2:
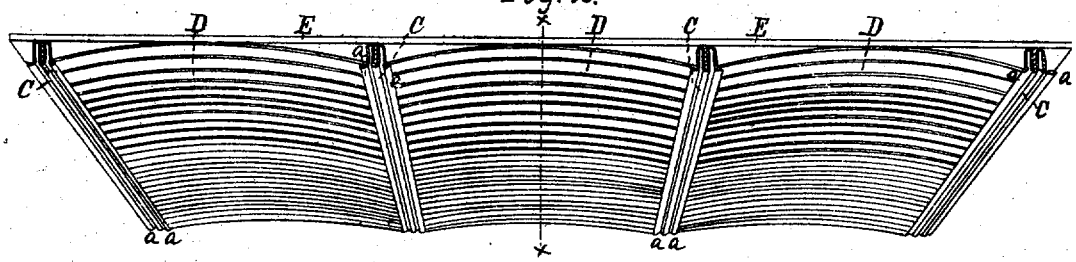
Figure 3:
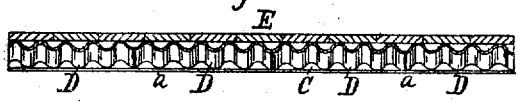
Figure 5:
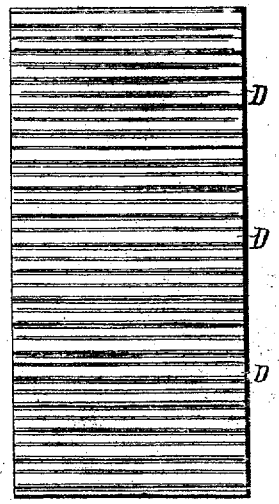

In the accompanying drawings, Fig. 1 is a perspective view, illustrating the upper side of my improved floor when planked over, embracing also a side elevation, or section thereof, in the direction of the arches transversed in the beams or girders supporting the same. Fig. 2 is a similar view, giving a perspective of the under side of the floor or platform, as constituting a ceiling for an apartment beneath it. Fig. 3 is a section, in line *x x* of Fig. 2, taken transversely through the arched plates and parallel to the girders.

The arched corrugated plates D D may be formed of thin sheet metal, corrugated into folds of any suitable depth and width, and arched in a curve of any desired radius. These may be readily manufactured out of sheet-iron by means of the improved machine for the purpose, for the which I obtained Letters Patent in the United States, bearing date April 12, 1859, and numbered 23,599.

My improved floors are constructed by first placing and properly securing in the usual manner, at suitable distances apart upon the framework or walls intended for the support thereof, a series of parallel, transverse metallic beams or girders C C. I prefer to use for the purpose beams formed with projecting flanges *a a* on either side thereof, (such as my patent longitudinally-corrugated beams, illustrated in the drawings, or the ordinary ⊥ and I iron rails and beams in common use,) from the fact that the flanges afford a ready support for the ends of the arched plates. Between these flanged beams or girders C C I insert the arched corrugated plates D, so that, with their ends resting upon the flanges *a a* of the beams on either side, they will completely span the intermediate open space. The edges of the plates D may be arranged to overlap each other, and thus form a continuous corrugated arch the entire length of the girders. In the construction of floors for cars, boats, and other light structures, I prefer to use corrugated plates, so curved as that the crown of the arches formed thereby between the beams shall be on a level with the upper surface of the beams or girders C C, as illustrated in the drawings, and thus afford intermediate support for the boards E E, with which the flooring may be finished; but where it is found preferable to obtain a wider support or bearing of the flooring, by filling in the space between the beams and over the arches with cement or concrete, as is customary in flooring over and upon arches of masonry, plates of less curvature may be employed. The plates D, thus formed and inserted between the beams or girders C C, not only serve to fully close the intervening open spaces, and to afford a firm, solid support to carry any superimposed weight, but form also ties or braces between the beams of the strongest nature. Hence the floors or platforms of cars, or the decks of vessels constructed therewith, will endure almost as much strain or pressure laterally as longitudinally, but with greater elasticity. Although I consider flanged beams, as described, preferable for supporting the arched plates D, the ends of the plates may, nevertheless, be also sustained by means of grooves in the beams, instead of flanges. The extreme lightness of a floor thus constructed of metal, as compared with a flooring of metallic beams and brick arches, renders it far preferable to the latter, while it may be made as completely fire-proof, and of equal solidity and strength.

I am aware that the employment of corrugated metallic arches constructed of sheet metal, so connected, by metallic rods forming chords to the arch, as to relieve the walls from their thrust, for the purpose of spanning wide intervals and of supporting a flooring, or forming a roof, has been heretofore proposed, such an invention being described in my application for Letters Patent still pending. I do not, therefore, in this application, claim corrugated arches connected by rods forming chords thereto. Nor do I claim, broadly, the use and application of arched corrugated metallic plates; but What I do claim as my invention, and desire to secure by Letters Patent, is—

A metallic support for a floor, whether the latter be formed of wood or other material, composed of arched metallic plates, corrugated in the direction of the curve of the arch and metallic girders, on or against which said plates abut, substantially as herein described.

R. MONTGOMERY.

Witnesses:
G. B. TOWLES,
DAVID A. BURR.